(12) United States Patent
Kleijn (10) Patent No.: US 8,290,143 B2
(45) Date of Patent: Oct. 16, 2012

(54) DELAY ESTIMATOR

(75) Inventor: Willem Bastiaan Kleijn, Lower Hutt (NZ)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/245,528

(22) Filed: Sep. 26, 2011

(65) Prior Publication Data

US 2012/0063572 A1    Mar. 15, 2012

Related U.S. Application Data

(63) Continuation of application No. 13/139,267, filed as application No. PCT/EP2009/063707 on Oct. 20, 2009.

(60) Provisional application No. 61/122,196, filed on Dec. 12, 2008.

(30) Foreign Application Priority Data

Dec. 12, 2008  (EP) .................................... 08171468

(51) Int. Cl.
*H04M 9/08*   (2006.01)
*G10K 11/16*  (2006.01)
*H03B 29/00*  (2006.01)
*H04B 3/20*   (2006.01)
*H04B 1/38*   (2006.01)

(52) U.S. Cl. .................. 379/406.06; 381/71.8; 348/613; 370/286; 455/570

(58) Field of Classification Search ........................ None
See application file for complete search history.

(56) References Cited

U.S. PATENT DOCUMENTS

| | | | |
|---|---|---|---|
| 5,959,500 A * | 9/1999 | Garrido ........................ 330/151 |
| 6,961,862 B2 * | 11/2005 | Best et al. ...................... 713/401 |
| 7,444,268 B1 * | 10/2008 | Kalamegham et al. ........ 702/189 |
| 2004/0252652 A1 * | 12/2004 | Berestesky et al. ........... 370/286 |
| 2007/0104299 A1 * | 5/2007 | Cahn et al. .................... 375/345 |
| 2009/0214048 A1 * | 8/2009 | Stokes et al. .................... 381/66 |

* cited by examiner

*Primary Examiner* — Fan Tsang
*Assistant Examiner* — Jeffrey Lytle
(74) *Attorney, Agent, or Firm* — Birch, Stewart, Kolasch & Birch, LLP (57) ABSTRACT

The present invention provides a method and apparatus for finding an estimate of the delay of a signal travelling between two points. A quantity is evaluated from the signal at a final number of time instants, at both a reference point and a reception point. The values are quantized by comparison with a threshold adapted to a typical magnitude of the quantity. If the quantized values from the reception point are shifted back by the true delay with respect to the quantized values from the referenced point, then certain co-occurrences of quantized values have very low probability. Hence, the best delay estimate is that shift which yields the least number of low-probability co-occurrences.

18 Claims, 5 Drawing Sheets

DELAY ESTIMATOR

This application is a Continuation of copending Application No. 13/139,267 filed on Jun. 10, 2011, which is a National Stage of co-pending PCT International Application No. PCT/EP2009/063707 filed on Oct. 20, 2009, which designated the United States and on which priority is claimed under 35 U.S.C. §120. This application also claims priority under 35 U.S.C. §119(e) on U.S. Provisional Application No. 61/122,196 filed on Dec. 12, 2008 and under 35 U.S.C. §119 (a) on European Application No. 08171468.5, filed Dec. 12, 2008. The entire contents of each of the above documents is hereby incorporated by reference into the present application.

BACKGROUND OF THE INVENTION

1. Field of the Invention

The present invention relates generally to methods and devices for use in communications networks. More precisely, it relates to a method and a device for estimating the delay of a signal travelling between two points in a communications network. The invention can in particular be used in applications for estimating or mitigating echo in communication equipment.

2. Background of the Invention

Consider an acoustic or electric signal that is known at a reference point and that travels in finite time through a system to a reception point. The delay is the time elapsed between the appearance of, say, a characteristic signal feature at the reference point and its reappearance at the reception point. In the concrete case of the system being a communications network, the delay may be the sum of the propagation time in various conducting materials, processing time in decoders and encoders, particularly conversions between analogue and digital format, waiting time during routing in packet-switched networks, and possibly propagation time in air if the signal is transmitted in acoustic form in some segment of the path.

Accurate estimates of the delay of an acoustic or electric signal travelling through a system are valuable in a number of applications, for instance, in echo cancellation and echo suppression in communications equipment, de-reverberation, echo localization, alignment of audio files for the purpose of fingerprinting, and the alignment of audio signals in recording studios.

An important application of delay estimation is echo suppression and echo cancellation in telephony. In this context, a far-end party and a near-end party communicate using a telecommunications network. The near-end party would like to receive only the speech signal spoken by the far-end speaker. However, because of acoustic echo or because of network echo, the near-end party may additionally receive the (distorted and delayed) speech signal spoken by him- or herself. This signal component in the signal travelling towards the near-end party is referred to as the echo signal. In the case of acoustic echo, the feedback path is acoustic and consists of acoustic speakers at the far-end and microphones that acquire the echo signal. In the case of network echo, the feedback path is electronic and results from imperfect transmission-line terminations.

To reduce the echo perceived by the near-end party, the echo signal must be decreased or eliminated. This is normally done by digital computing means using adaptive filtering (echo cancellation) and/or by gain control (echo suppression). The adaptive filter of echo cancellation is optimized to remove the signal component that correlates with the signal travelling towards the far-end party by subtracting it from the signal travelling towards the near-end party. Finding the relative delay (the bulk delay) of the signal travelling to the far end and the echo signal is implicit in this optimization and is generally based on correlation, albeit sometimes in a broad sense. An initial estimate of the bulk delay is commonly used to reduce the required number of the correlation computations for echo cancellation. In the case of echo suppression, heuristic rules are generally used to suppress the signal travelling towards the near end whenever it mostly consists of the signal spoken by the near-end party. Echo suppression requires knowledge of the relative delay between the signal travelling to the far end and the echo signal. An estimate of the relative delay is usually computed by means of cross correlation.

Available delay estimation methods for echo cancellation, such as the method disclosed in International Patent Application PCT/FI94/00577 (published as WO 95/17784), are generally directly or indirectly based on cross correlation. The cross-correlation operation however has drawbacks. These include that the method has high computational complexity for long sequences and if a large search range of possible delays is used. A second drawback is that the performance of cross-correlation based methods generally deteriorates if the relation between the echo signal and the signal travelling to the far-end cannot be described accurately by a linear filtering operation. That is, performance is reduced if the feedback path introduces nonlinear distortions. A third drawback applies to systems with time-varying delay: it is difficult to balance old and new information about the delay. Usage of a long but finite evaluation interval imposes large storage and computational requirements. Alternatively, an implicit exponential decay of older data must be used, such as by iterative multiplication by a factor less than unity, which generally performs less well.

The disadvantages of high computational effort, sensitivity to non-linear distortions in the feedback path, and the difficulty in removing old information motivate alternative delay estimation methods. Alternative delay estimation methods can be used to reduce the search range in echo cancellation and as a first or final estimate of the delay for echo suppression.

SUMMARY OF THE INVENTION

An object of the present invention is to wholly or partly overcome the above disadvantages and drawbacks of the prior art and to provide improved methods and devices for delay estimation. Another objective is to provide low sensitivity to nonlinear distortions in the feedback path. It is desirable to obtain estimates having relatively high accuracy at a relatively low computational effort.

Hence, as defined by the appended independent claims, the present invention provides a method and apparatus for finding an estimate of the delay of a signal between two points separate in space.

Although the present invention does not require stable statistics, its formulation is based on the concept of joint probability of values of measurements of the signal at the reference point and of the signal at the reception point, as a function of the time delay between the measurements. The measurements can be of any suitable quantity, such as momentary or average energy content. Existing methods for delay estimation generally use averages of cross-correlations or averages of differences between measurements to evaluate the delay. In contrast, the present invention is based on counting co-occurrences of value ranges in the two sets of measurements, which forms a discrete approximation to the joint probability for data with stable statistics. It is well-known to persons skilled in the art that the joint probability provides more information about the relation between two variables than the average cross-correlation or the average difference. Thus, usage of the joint probability facilitates a better estimate of the delay.

Advantageously, the measurements are quantized into a simplified, preferably binary, form by comparison with a threshold adapted to a typical magnitude of the quantity as evaluated at the reference and the reception point. Following the typical attenuation or amplification of the signal, the method may apply different thresholds at the two points for values of a given quantity. Hence, two binary sequences are obtained consisting of one-bit-quantized (i.e., Boolean) values of the quantity as evaluated at the reference point and the reception point. In the particular case of an audio signal, a binary 1 denotes strong audio activity, such as a speaker speaking, whereas a binary 0 denotes weak audio activity, such as silence or near silence.

There are four possible co-occurrences of the quantized values:

$$(0,0), (0,1), (1,0) \text{ and } (1,1). \tag{1}$$

Here, (0,1) denotes 0 (low value) at the reference point and 1 (high value) at the reception point. Similar pairs can be formed from simultaneous measurements at the reception point and the reference point or from time-shifted measurements.

Consider an embodiment of the inventive idea where the thresholds are selected in a natural manner. First suppose that a signal propagates between the reference point and the reception point without delay. Then the combination of strong audio activity at the reception point and weak audio activity at the reference point, corresponding to the pair (1,0), should not be possible in a pair, as the high value measured at the reference point should have given rise to a high value at the reception point too. In practice, this means that (1,0) has a low probability of occurrence. Now, if the delay is D, a non-zero number, the pair (1,0) may occur in pairs of simultaneously measured values. However, it is reasonable to expect that is has a low probability of occurrence when the delay has been properly compensated by back shifting, at least for backshifts by D or numbers close to D. For other back shifts than D, the pair (1,0) has a higher probability of occurrence. Thus, the delay D can be found counting the co-occurrences (1,0) for different back shifts and selecting the delay with the lowest count (relative frequency). For better performance, the other co-occurrences can also be considered.

By the method according to a first aspect of the invention this procedure can be generalized in that the relative frequencies are not determined, but a penalty is assigned to the least probable co-occurrence(s) and stored in a table. After defining a set of candidate delays, penalties for corresponding quantized values in the binary sequences when shifted back by one of the candidate delays are read from the table and summed. By comparing the respective average penalties for the different candidate delays over a suitable time interval, a candidate delay corresponding to the most probable true delay can be elected. In the exemplary case discussed above, one may accordingly assign a penalty of −1 to the co-occurrence (1,0) and a penalty of 0 to the three others.

In different particular embodiments, the quantity that is evaluated from the signal may be a momentary value or an average over a time segment of finite length. Suitably, the length is between 50 and 1000 milliseconds. In some embodiments, two or more of such time segments may overlap.

In an embodiment adapted to a particular operating situation, one preferably uses a quantity that is simple to evaluate and leads to a distinctive indication of the delay already with a small number of measurements. In addition to the signal energy, as previously mentioned, various embodiments may use:

a component in an encoded audio or video format, such as an MPEG format,
a power of the signal in a predetermined frequency band,
an absolute value of the signal,
an amplitude of the signal,
an amplitude of the time-domain signal envelope,
an integral over time of the absolute value of the signal, or
an integral over time of the absolute value of the time derivative of the signal.

For each of the above quantities, a non-zero penalty will be associated with one or more of the four possible co-occurrences (see formula (1)) in such a way that the assigned penalties reflect the degree of synchronicity of two parallel sequences of measurements of a signal. The penalty scores may have a quite simple structure, penalizing the least probable co-occurrence by a positive constant as above, or may be negative values (i.e., anti-penalties, or figures of merit) approximately corresponding to the expected probabilities. In either case, the candidate delay with the greatest likelihood will be associated with the least (signed) penalty average.

In accordance with particular embodiments, more than one quantity can be evaluated from the signal. Since more information is thus available for a given number of time instants, an indication of the most likely candidate delay will then be obtained faster at the price of an increased momentary computational load.

In one embodiment, signal powers for a windowed signal segment in a plurality of frequency bands are used as quantities. It is then advantageous to pass the signal through a filter bank, before evaluating the signal power. The filters may be digital, preferably applying some Fourier-transform method, or may be analogue. The signal power of a windowed signal segment as a function of the frequency bands is referred to as a periodogram. If each component in a periodogram is then compared with a threshold a binary vector is obtained having as many components as the periodogram. This means that if 32 bands are used, each periodogram, representing a short-time power spectrum of the signal, can be stored in a single 32-bit integer, so that the storage requirements are negligible.

In accordance with another embodiment, the values of the quantity may be quantized in more steps than two, so that multi-bit quantized values are obtained. If, for instance, the values are compared with three different thresholds, each value can be placed in one of four intervals, the endpoints of which correspond to the thresholds. As is well-known, that interval of the four which contains the value can be characterized by a two-bit binary representation of its ordinal number. The number of thresholds used for reference values may be different than the number used for reception values. Although available computers generally store information in binary form, embodiments of the invention may equally well comprise a number of quantization levels that is not a power of 2. While preferably the number of thresholds is small, some application may benefit from using an increased number of thresholds at either the reference point, the reception point or both.

According to a second aspect of the present invention, a delay-estimating device.

In one embodiment, the delay-estimating device comprises at least one threshold circuit for quantizing the measured values of the at least one quantity, wherein the value of the threshold is variable and is provided by a specifying circuit. In another embodiment of the delay-estimating device, the threshold circuit is adapted to quantize values of the quantity or quantities (as measured at the reference point, the reception point or both) with respect to more than one threshold for each quantity. In a further embodiment of the delay-estimating device, at least one of the reference point and the reception point is located in a communications network. In other embodiments, analogously to the method according to the first aspect of the present invention, the delay-estimating device may be adapted to measure at least one quantity which is a momentary value or at least one quantity which is a time average over a finite time interval. Such time intervals may or may not overlap in time.

In accordance with a third aspect of the present invention, a delay-estimating device according to the invention may be a component in an echo-cancelling circuit. The echo-cancelling circuit may for example contain a feed-forward adaptive filter, the quantitative characteristics of which are variable as a function of the delay estimated by the device according to the invention.

Further objectives of, features of, and advantages with, the present invention will become apparent when the following detailed disclosure, the drawings and the appended claims are studied. Those skilled in the art will realize that different features of the present invention can be combined to create embodiments other than those described.

BRIEF DESCRIPTION OF THE DRAWINGS

The above, as well as additional objectives, features and advantages of the present invention, will be better understood through the following detailed description and accompanying drawings, of which.

All the figures are schematic and generally only show parts which are necessary in order to elucidate the invention, wherein other parts may be omitted or merely suggested.

DETAILED DESCRIPTION OF PREFERRED EMBODIMENTS

Figure 1:
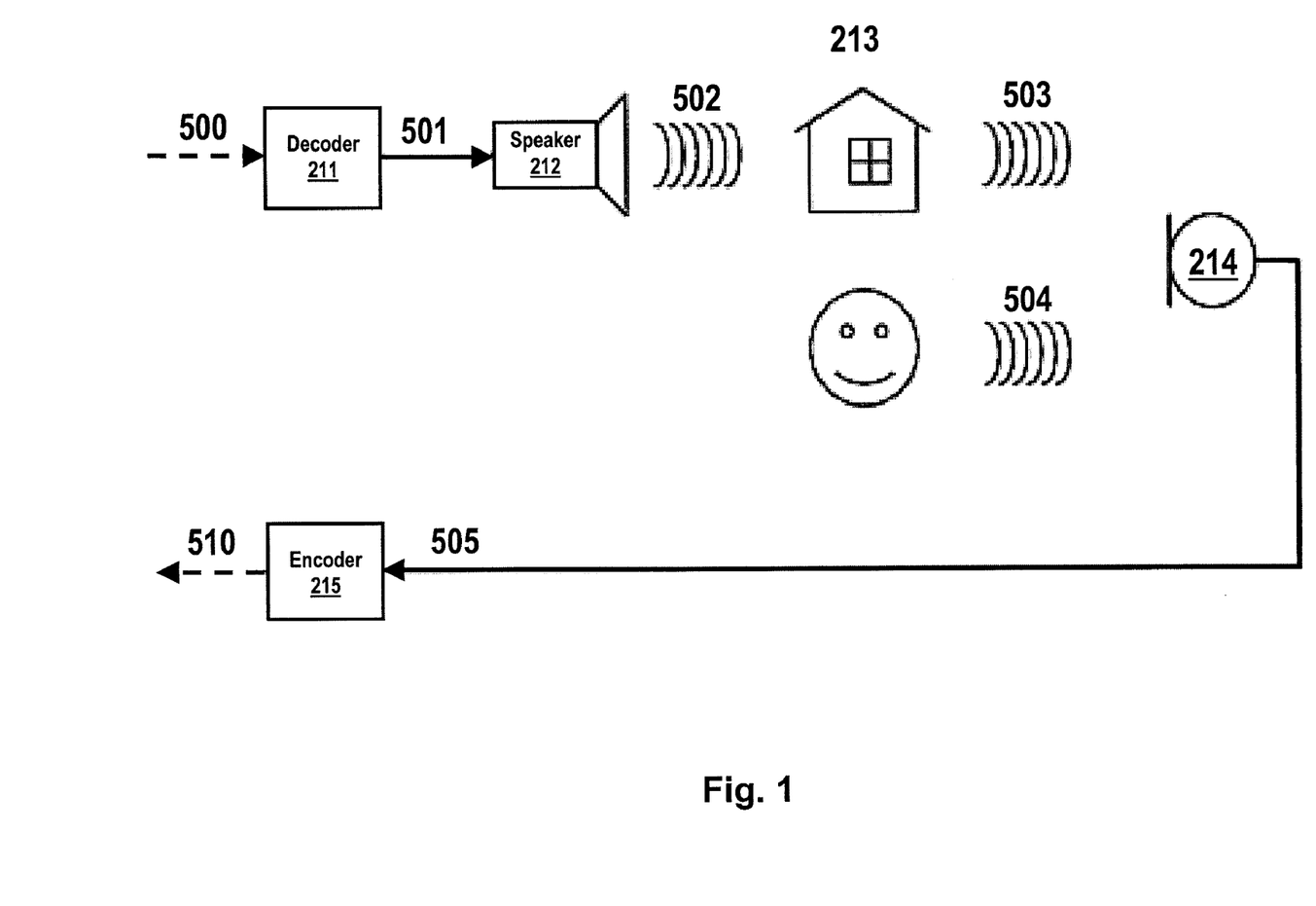
FIG. 1 shows an illustrative situation in which the present invention can be applied.

FIG. 1 shows the acoustic feedback loop commonly present in hands-free communication devices such as computers used for voice-over-IP speaker phones or hands-free telephones. The technical problem to be solved can be exemplified by the case of a telephone call involving one near-end party and one far-end party. The input signal 500 is the speech signal spoken by the near-end party. It arrives at the far-end in digital format, and can be in the form of a compressed bit stream. Decoder 211 contains a digital-to-analogue converter that converts the signal to a continuous-time analogue signal. If the signal is compressed then decoder 211 uses a decoding algorithm to decompress the signal as well. Analogue signal 501 is sent to one or more speakers 212, which generate an acoustic signal 502 that is subjected to the room transfer function 213. The modified acoustic signal 503 is acquired by the microphone 214. Microphone 214 may additionally have the input 504, spoken by the far-end party, and other far-end generated acoustic signals. The analogue signal 505 that forms the output of the microphone is sent to encoder 215 that either performs an analogue-to-digital conversion or an analogue-to-digital conversion followed by compression by means of any suitable algorithm. The resulting bit stream 510 is transmitted to the near-end party.

It will be clear to a person skilled in the art that even when signal 504 is not active (is zero), signal 510 generally differs significantly in amplitude and spectral colouring from signal 500, and is delayed. Without appropriate compensation, the near-end party will receive a delayed and distorted copy of the speech signal spoken by him- or herself. This echo that the near-end party hears makes conversation difficult. To remove the problem, echo cancellation and/or suppression is used. The computational effort to perform echo cancellation and suppression is significantly reduced if the delay of signal 510 relative to signal 500 is known. The present invention is adapted to estimate the delay between the signal 500 sent from the near end and the signal 510 received at the near end, using only signals 500 and 510 as input to the estimation procedure. Echo cancellation and suppression is an important application of the current invention.

Prior to showing a device adapted to perform the inventive method, the underlying method will be described in terms of the information that is received and processed. In an illustrative example, the quantity used for estimating the delay between the signals will be the signal power in different frequency bands. More precisely, the measurement of the signal 510 at the reference point and the measurement of the signal 500 at the reception point are modelled, respectively, as functions x(t), y(t) of continuous time. For the purpose of processing, the method will consider time intervals $T_p=(t_p^{(1)}, t_p^{(2)})$, p=1, ..., P, and frequency bands (these could correspond to the frequency bins of a Fourier-transform filter) $F_q$ ($f_q^{(1)}, f_q^{(2)}$), q=1, ..., Q. By conventional analogue filtering or by digital processing, a periodogram is computed for each signal and each time interval. In time interval $T_p$, the periodogram of x(t) is the non-negative real vector $\xi_p=(\xi_{1,p}, \xi_{2,p}, \ldots, \xi_{Q,p})$, where $$\xi_{q,p} = \int_{F_q} \left| \int_{T_p} e^{-j2\pi ft} x(t)w(t)dt \right|^2 df. \quad (2)$$

where w(t) is a window, which advantageously can be chosen to be the Hann window. For discrete-time processing the time integral is replaced by a summation and no integration in frequency is used; q then simply indexes the frequency bins. Similarly, the periodogram of y(t) is where $\eta_p=(\eta_{1,p}, \eta_{2,p}, \ldots, \eta_{Q,p})$, where $$\eta_{q,p} = \int_{F_q} \left| \int_{T_p} e^{-j2\pi ft} y(t)w(t)dt \right|^2 df. \quad (3)$$

For later convenience the term channel is defined to mean the vector $\xi_q=(\xi_{q,1}, \xi_{q,2}, \ldots, \xi_{q,P})$ and its counterpart for the signal at the reception point.

Fixing thresholds $\tilde{\xi}_1, \tilde{\xi}_2, \ldots, \tilde{\xi}_Q$, each representing a lowest significant level of signal power, each periodogram is quantized into a binary Q-vector $X_p=(X_{1,p}, X_{2,p}, \ldots, X_{Q,p})$, where $$X_{q,p} = \begin{cases} 1 & \text{if } \xi_{q,p} \geq \tilde{\xi}_q \\ 0 & \xi_{q,p} < \tilde{\xi}_q. \end{cases} \quad (3)$$

Similarly, one fixes thresholds for the other signal to obtain $$Y_{q,p} = \begin{cases} 1 & \text{if } \eta_{q,p} \geq \tilde{\eta}_q \\ 0 & \eta_{q,p} < \tilde{\eta}_q. \end{cases} \quad (4)$$

The thresholds can also be the average channel values, the median channel $^I$values or any other quantile value of the channels. A buffer will collect these binary vectors into finite sequences, in other words binary matrices, $X=(X_1, \ldots, X_{K+D_M})$ and $Y=(Y_1, \ldots, Y_K)$; the constants used in the indices will be defined shortly.

As established above, penalties for each of the four possible co-occurrences are now assigned in accordance with their expected probabilities, which are known a priori by empirical studies or can be estimated with sufficient accuracy. For the exemplary situation described above, the penalties can be chosen as per the fourth column of Table 1, which will be further discussed below. Note that the periodogram values $X_{q,p}$ and $Y_{q,p}$ represent, in general, different time intervals. Furthermore, note that it is not necessary for the embodiment to work that a probability distribution can be defined. A strength of the method is that it works even when the statistics of the measurements are time-variant.

TABLE 1

| $X_{q,p}$ | $Y_{q,p}$ | Probability | Penalty | Penalty, $1^{st}$ alt. | Penalty, $2^{nd}$ alt. |
|---|---|---|---|---|---|
| 0 | 0 | 0.25 | 0 | 1 | −0.25 |
| 0 | 1 | 0.30 | 0 | 0 | −0.30 |
| 1 | 0 | 0.05 | 1 | 2 | −0.05 |
| 1 | 1 | 0.40 | 0 | −1 | −0.40 |

It is emphasized that this approach is different from calculating the cross correlation between the two signals. The cross correlation is a function of the time shifts, the maximum of which occurs exactly when the time-shifted signals exhibit the largest degree of likeness. In other words, co-occurrences (1,1) and (0,0) contribute to the value of the cross correlation, whereas co-occurrences (0,1) and (1,0) do not. This simple search for likeness is not suitable in an arbitrary situation. For instance, when the feedback path is nonlinear, cross correlation performs poorly. Moreover, even when the delay varies somewhat over time, the present method will perform well, while cross correlation methods generally will fail due to the lack of a probability distribution that is stable in time.

M candidate delays $D_1<D_2<\ldots<D_M$, each expressed as a multiple of the distance of consecutive time instants, are then defined. Then the average penalty for each candidate delay is computed. For the $q^{th}$ quantity, the $m^{th}$ candidate delay and with averaging over K time instants, the average penalty is given by $$\Delta_{q,m} = \frac{1}{K} \sum_{k=1}^{K} \text{penalty}(X_{q,k+D_m}, Y_{q,k}). \quad (5)$$

If averaging is performed over K time instants and the longest candidate delay is $D_M$, the binary matrices X and Y are required to have $K+D_M$ and K columns, respectively, as indicated above. It is not essential that K time instants are used for calculating $\Delta_{q,m}$ for all candidate delays. If in some embodiment it is desirable to use an equal number of columns in the matrices, the method may perform averaging over a smaller number of time instants for the larger candidate delays, so that no extra columns to the right need to be included in X.

Figure 5:
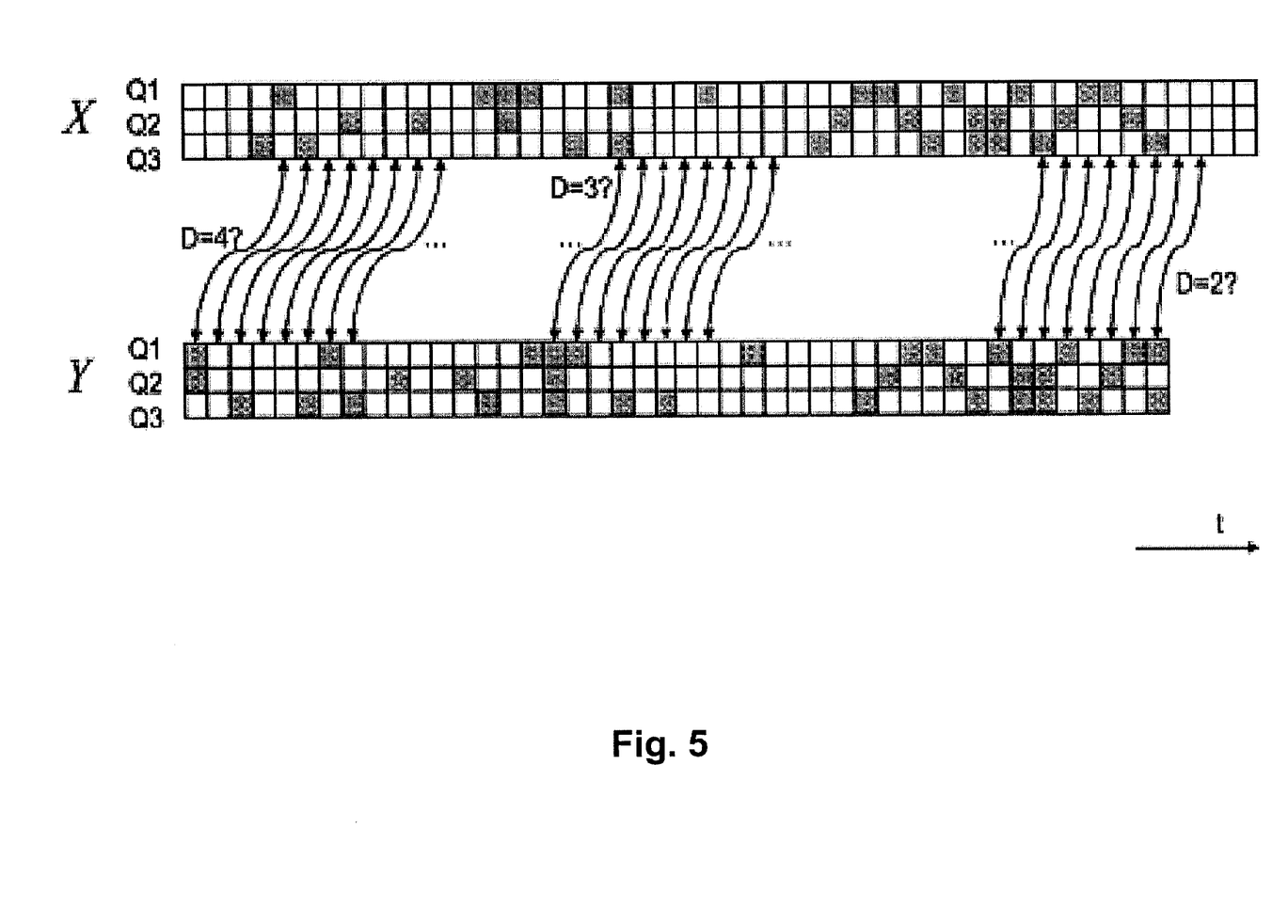
FIG. 5 illustrates the algorithm for assessing synchronicity of the quantized values.

The computing of average penalties is schematically illustrated in FIG. 5, which shows matrices X and Y in a case where Q=3, K=44 and $D_M$=4. Each square element corresponds to a matrix entry and its colour illustrates its (Boolean) value. Looking at the patterns one may guess that matrix X is matrix Y delayed (i.e., right-shifted) by 2 units plus some noise, and the inventive method is adapted to return 2 as an estimated delay in this case. Sequences of curved arrows illustrate which columns are to be compared for the candidate delays 2 (denoted by "D=2?"), 3 (denoted by "D=3?"), and 4 (denoted by "D=4?"). The elliptic dots indicate that the sequences of arrows should go on up to the outermost columns, so as to make use of all available information. It is noted that the two rightmost columns in X are not used when the average penalties for candidate delay 2 are computed.

A particular embodiment of the invention does not compare consecutive pairs of time instants, but compares every other pair, every third pair, etc. Put differently, equation (5) is replaced by a modified average penalty:

$$\Delta'_{q,m} = \frac{1}{K} \sum_{k=1}^{K} \text{penalty}(X_{q,kN+D_m}, Y_{q,kN}), \quad (6)$$

where N is an integer defining the spacing of the pairs of time instants to be compared. Instead of having $K+D_M$ and K columns, respectively, matrices X and Y then have $KN+D_M$ and KN columns. This embodiment is advantageous in virtue of its reduced computational load.

After the full set of average penalties has been determined, weighted sums can be formed as per $$\Delta_m = \sum_{q=1}^{Q} c_q \Delta_{q,m}, \quad (7)$$

where coefficients $c_1, c_2, \ldots, c_Q$ preferably reflect the importance attributed to each of the quantities. For instance, if the quantities are audio energies in different frequency bands, a frequency band in the audible range should be given a greater importance, particularly if the energy content of the signal is expected to be relatively high in this frequency band. One may of course achieve a similar effect by summing the average penalties using equal coefficients in (6) provided the penalties of relatively important quantities generally have larger magnitudes than those of relatively less important quantities.

Having produced the weighted sums $\Delta_1, \Delta_2, \ldots, \Delta_M$, it is now a straightforward matter to find the smallest (signed) value. The corresponding delay among the candidate delays $D_1, D_2, \ldots, D_M$, is the winning one, and will be the best estimate.

Table I above shows two alternative sets of penalties in addition to that discussed in section Summary of the invention, which penalizes the least probable event (1,0) only. As (1,0) is expected to have low probability for the correct delay it is penalized, proportionally to the number of times it occurs. The first alternative set of penalties is simple in so far as the penalties are integer numbers that reflect the unequal counts expected for (0,0), (0,1) and (1,1). Again, as (1,0) should not occur for the correct delay, it is penalized most strongly. The co-occurrences (0,0) and (1,1) are weak indicators that the delay is correct and for this reason receive a negative penalty. Co-occurrence (0,1) does not provide information about the correctness of the candidate delay and therefore is assigned a neutral penalty. It is noted that for the first two penalty sets, knowledge about the probability distribution of the co-occurrences is not required. The second alternative set of penalties in Table 1 consists of the probabilities themselves. For stable statistics, this choice results in a minimum in the average penalty if the observations have the correct probability distribution, that is, if the observations are back-shifted by the correct delay.

Figure 2:
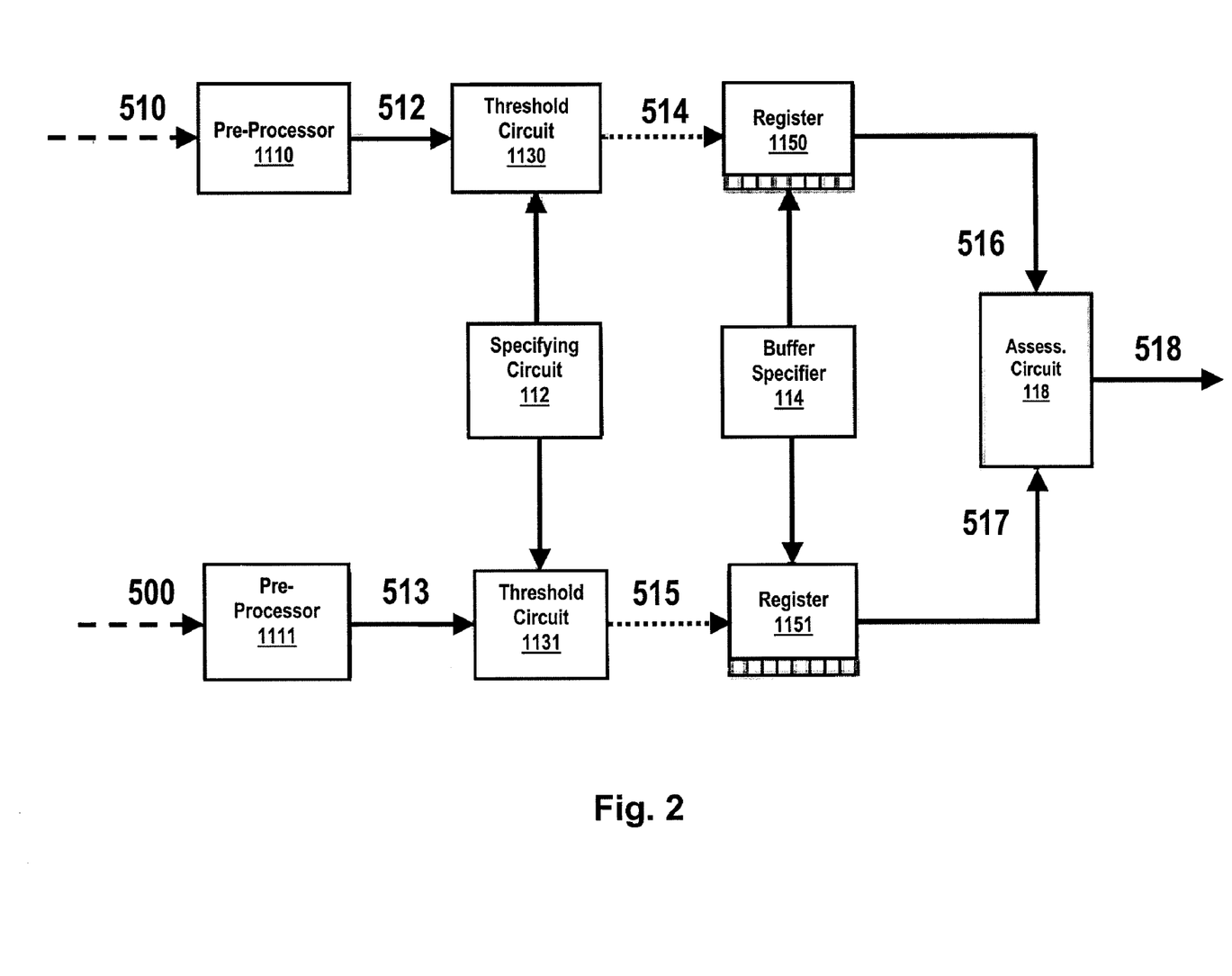
FIG. 2 shows an device for delay estimation according to an embodiment of the present invention.

A delay-estimating circuit according to the present invention will now be described with reference to FIG. 2. Two signals 500 and 510 form the input. These two signals may correspond to the acoustic echo feedback path illustrated in FIG. 1, or any other set of signals that form the input and the output of a physical system. More generally, they can be any two signals such that the second contains a delayed copy of the first.

Each of the input signals 510 and 500 is separately pre-processed in pre-processors 1110 and 1111, which have identical functionalities. The output of each pre-processor is a sequence of vectors (or scalars). Advantageously, that is, if signal energy in a plurality of frequency bands are used as quantities, vector sequences 512 and 513 are sequences of periodograms for the input signals 510 and 500, respectively.

Figure 3:
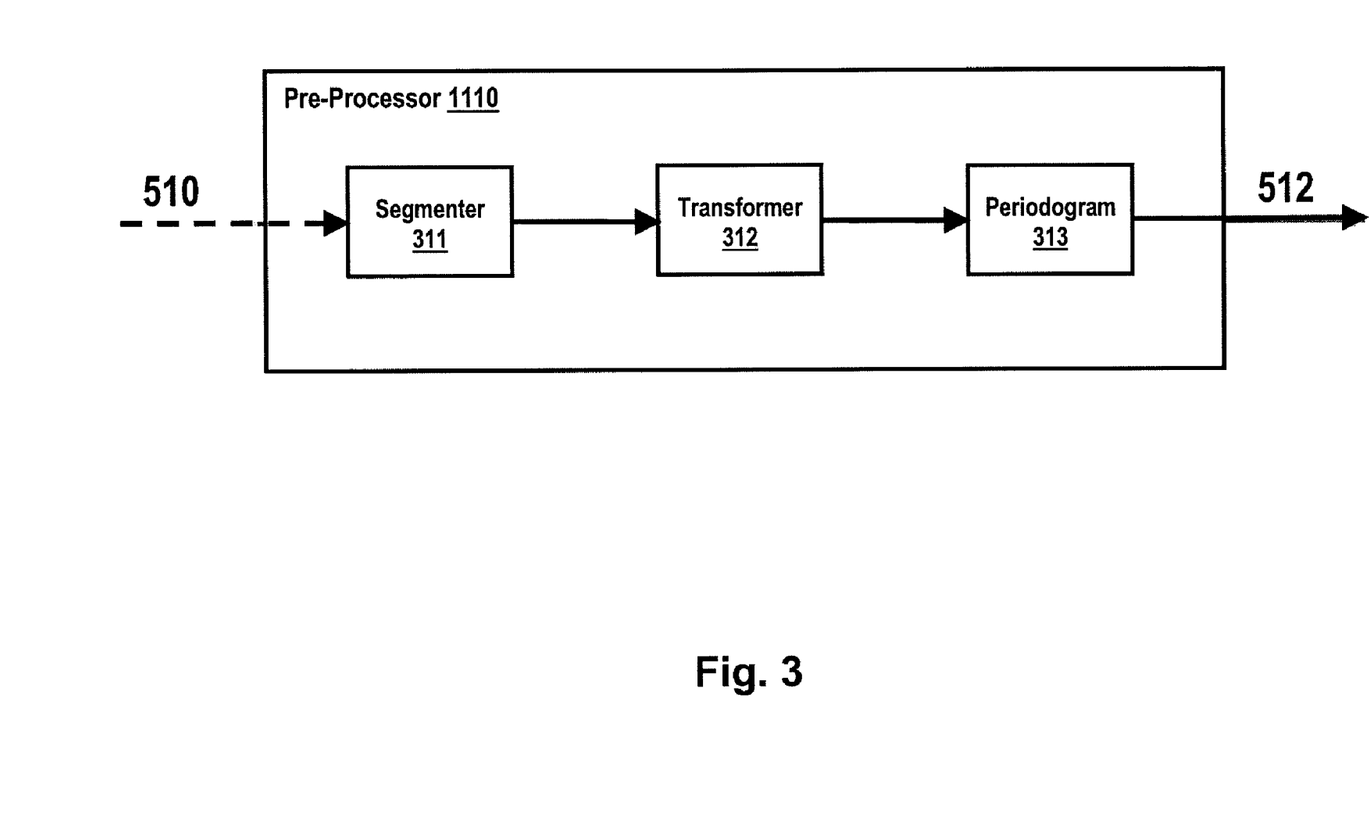
FIG. 3 shows an apparatus for pre-processing signal data according to an embodiment of the present invention.

FIG. 3 shows the operation of pre-processor 1110 in more detail. Pre-processor 1111 functions similarly. The input signal 510 is first segmented into time segments that may overlap in a segmenter 311. Advantageously, the successive segments created by segmenter 311 are separated in time by 10 ms and the segments have a length of 20 ms. A transformer 312 performs a windowing and Fourier-transform operation. The output of transformer 312 is a discrete, short-time complex spectrum. Periodogram computer 313 takes this complex spectrum and applies the absolute operator to each spectrum component and squares the results to render a periodogram 512, which is a short-term power spectrum estimate. The periodogram is a vector property of the signal segment that is the output of segmenter 311.

Returning to FIG. 2, the specifying circuit 112 stores what subset of channels is to be used for delay estimation. Thus, the specifying circuit 112 specifies the active channels. Specifying circuit 112 also stores the thresholds that are to be applied to the active channels. A first and second threshold circuit 1130 and 1131 determine for each active channel whether the value for the current segment is above or below the threshold. This operation is equivalent to one-bit quantization. Vector signals 514 and 515 are a time-sequence of bit vectors, in which each one-bit component expresses the value of an active part of the periodogram (representing a short-term power spectrum) relative to the thresholds set by specifier 112.

Advantageously, and as an innovative part of the present invention, each of the vectors of vector signals 514 and 515 can be stored in a single digital integer number, reducing storage requirements on most computing devices significantly. This approach is particularly efficient if 32 or 64 channels are active, as the combined hardware and software on many computing devices are adapted to handle 32- and 64-bit integers. Note also that this method of using integers to denote the one-bit quantization index facilitates generalization for multiple thresholds The output is then an index that requires form thresholds loge (m+1) bits to be described. Thus each vector has loge (m+1) bit planes that each can be described by an integer. Below, a bit vector written in the form of a single integer (one-bit quantization) will be called a spectral integer. However, it is understood that in certain applications and for certain channel numbers, bit vectors are used without being stored as spectral integers.

Buffer specifier 114 specifies the length of a first and second shift register 1150, 1151. For reasons already stated, the second shift register 1151 can be shorter than the first shift register 1150. Thus, the buffer specifier specifies how many spectral integers are stored in shift registers 1150 and 1151 for each active channel. Whenever a new spectral integer is acquired, the least recent spectral integer is discarded. It is the age of the latest discarded spectral integer (the length of the shift register) that is specified by buffer specifier 114. Advantageously this age is the same for all channels in signal 514 and, separately, for all channels in signal 515.

The actual age used depends on the signal that the delay is estimated for. If the delay is constant, the accuracy of the delay estimate increases with the length of the buffer. If the delay is changing, then an age that is a good compromise for the rate of change of the delay must be selected. In this embodiment this is determined by a designer of the system, but automated procedures can also be used for this purpose. As seen above, the lengths of the buffers can be calculated on the basis of the largest candidate delay, the desired number of time instants to be compared and, when applicable, their consecutive spacing.

A delay assessment circuit 118, which can be implemented in a number of different ways, is adapted to calculate the average penalty for each candidate delay. In the conceptually simplest implementation, the delay assessment circuit 118 receives the entire buffer content 516, 517 from buffers 1150, 1151 and makes computations according to equation (5). From the results of the computations, the assessment circuit 118 outputs a signal indicative of the estimated delay (518).

Figure 4:
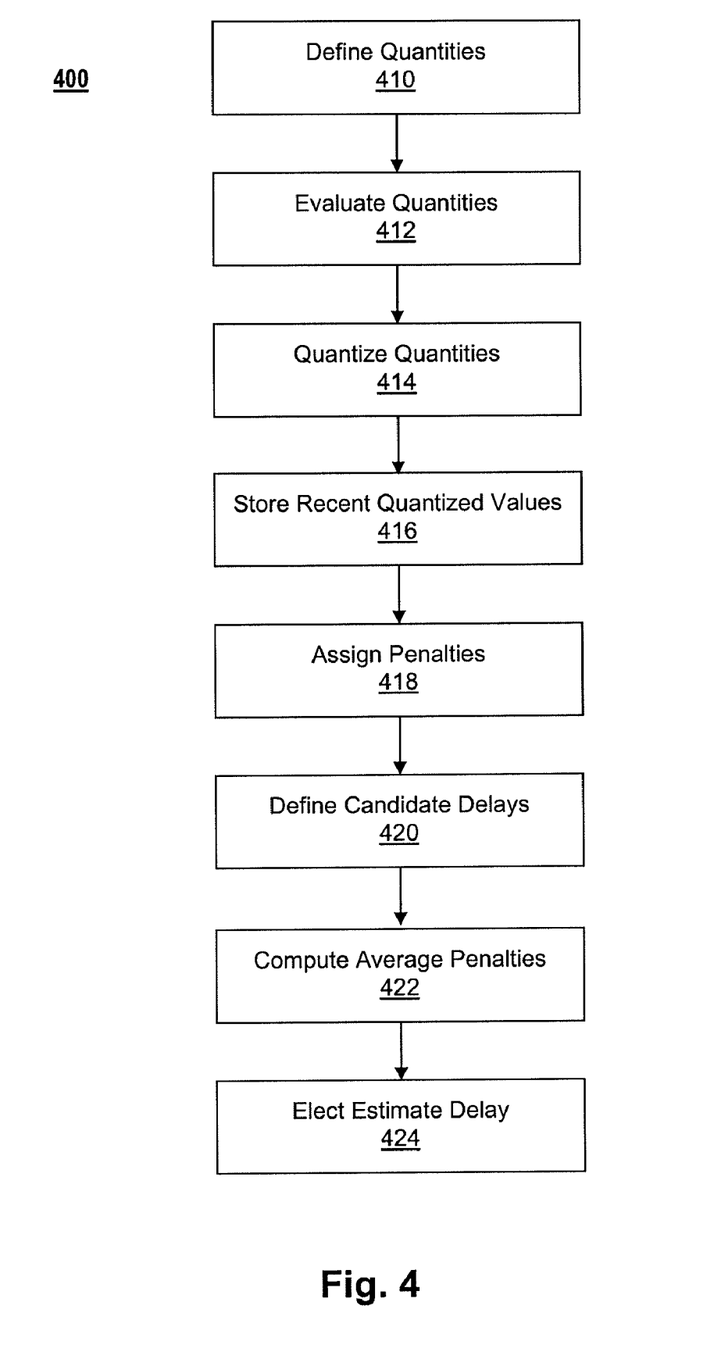
FIG. 4 is a flowchart of a method for estimating a delay of a signal, according to an embodiment of the invention.

FIG. 4 illustrates an embodiment of a method 400 according to the invention for estimating the delay of a signal between a reference point and a reception point. FIG. 4 is a flowchart depicting the steps of the method in the case of three quantities and five candidate delays. In step 410, the three quantities are defined. Next, in step 412, each of the quantities is evaluated at the reference point and the reception point at a plurality of time instants. In step 414, the values of the three quantities are quantized by comparison with thresholds. The thresholds are time-invariant in the sense that for each quantity, an equal threshold is used for all time instances. Subsequently, in step 416, the most recent quantized values are stored. A penalty is assigned to each of the possible ordered pairs of simultaneous quantized values; this is step 418. In step 420, a set of five candidate delays are defined. Then, in step 422, an average penalty is computed for each candidate delay. The average is based on the three quantities and a plurality of pairs of quantized values. Finally, in step 424, an estimate delay is elected from the set of candidate delays on the basis of the computed average penalties. It is noted that step 418 may be performed at any instant after the step 410 of defining the quantities and before the step 422 of computing an average penalty.

While the invention has been illustrated and described in detail in the drawings and foregoing description, such illustration and description are to be considered illustrative or exemplary and not restrictive; the invention is not limited to the disclosed embodiment. It is understood that some components that are included in the disclosed embodiments are optional. For example, decoders and encoders may not be present if the invention is embodied in a public telephone network according to older standards.

Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

The invention claimed is:

1. A method for estimating a delay of a signal between a reference point and a reception point, the method comprising the steps of:
   defining at least one quantity of said signal; and
   for each quantity, performing the steps of:
      evaluating the quantity at the reference point and at the reception point at a plurality of time instants, thereby yielding reference-point values and reception-point values, respectively;
      quantizing the reference-point values by comparing each of said reference-point values with a first time-invariant threshold and quantizing the reception-point values by comparing each of said reception-point values with a second time-invariant threshold, thereby yielding quantized reference-point values and quantized reception-point values, respectively;
      storing the most recent quantized reference-point values and the most recent reception-point values;
      assigning a penalty to each of all possible pairs of quantized values, each pair consisting of a quantized reference-point value followed by a quantized reception-point value, said penalty being based on an expected probability of simultaneous occurrence of the values of said pair when the delay is correctly estimated;
      for each candidate delay from a set of candidate delays, each expressed as a multiple of the time-distance between consecutive time instants, computing an average penalty by averaging the penalties of a plurality of pairs of stored quantized values, each pair including a stored quantized reference-point value evaluated at a first time instant followed by a stored quantized reception-point value evaluated at a second time instant, wherein the first and the second time instants are time-shifted by the candidate delay; and
      electing an estimated delay from the set of candidate delays based on the computed average penalties,
   wherein a first constant penalty is assigned, for a particular quantity, to the simultaneous occurrence of a high quantized reference-point value and a low quantized reception-point value, and a second penalty is assigned to all other occurrences, wherein the first penalty is greater than the second penalty.

2. A method according to claim 1, wherein said particular quantity is the signal power in a predetermined frequency band.

3. A method according to claim 1, wherein defining the at least one quantity of said signal includes defining at least one of a component in an encoded audio or video format, a power of the signal in a predetermined frequency band, an absolute value of the signal, an amplitude of the signal, an amplitude of the signal envelope, an integral over time of the absolute value of the signal, and an integral over time of the absolute value of the time derivative of the signal.

4. A method according to claim 1, wherein the step of quantizing further comprises comparing values of said at least one quantity with at least one further time-invariant threshold, thereby yielding multi-bit quantized values.

5. A method according to claim 4, wherein the number of further time-invariant thresholds is at most 20.

6. A device for estimating a delay of a signal between a reference point and a reception point, comprising:
   a first and a second pre-processor for evaluating, at a plurality of time instants, at least one quantity from the signal at the reference point and at the reception point to yield reference-point values and reception-point values, respectively;
   a first and a second threshold circuit for quantizing said reference-point values with respect to a first threshold and said reception-point values with respect to a second threshold, which values are received from said first and second pre-processor, respectively;
   a first and a second shift register for storing the most recent quantized reference-point values and the most recent quantized reception-point values, which quantized values are received from said first and second threshold circuit, respectively; and
   a delay assessment circuit for receiving the stored quantized values from said first and second shift registers, wherein a predetermined penalty is associated with each of all possible pairs of quantized values, each pair consisting of a quantized reference-point value followed by a quantized reception-point value, said penalty being based on the expected probability of simultaneous occurrence of the values of said pair when the delay is correctly estimated, said delay assessment circuit being configured for:
      computing, for each candidate delay in a set of candidate delays, each expressed as a multiple of the time-distance between consecutive time instants, an average penalty by averaging the penalties of a plurality of pairs of stored quantized values, each pair consisting of a stored quantized reference-point value evaluated at a first time instant and a stored quantized reception-point value evaluated at a second time instant, wherein the first and second time instants are time-shifted by the candidate delay; and
      electing an estimated delay from the set of candidate delays based on the computed average penalties,
   wherein each of said first and second threshold circuit is configured to quantize values of said at least one quantity with respect to at least one further first threshold and with respect to at least one further second threshold.

7. A device according to claim 6, further comprising:
   a specifying circuit for providing said first and second threshold circuit with said first and second thresholds, respectively.

8. A device according to claim 6, wherein the reference point and the reception point are located in a communications system.

9. A device according to claim 8, wherein said at least one quantity is a momentary value.

10. A device according to claim 8, wherein said at least one quantity is averaged, for each time instant, over a finite time interval.

11. A device according to claim 10, wherein two of said intervals overlap in time.

12. A device according to claim 11, wherein the lengths of said intervals are between 50 and 1000 milliseconds.

13. An echo-cancelling circuit including a device according to claim 11.

14. A method for estimating a delay of a signal between a reference point and a reception point, the method comprising the steps of
defining at least one quantity of said signal; and
for each quantity, performing the steps of:
evaluating the quantity at the reference point and at the reception point at a plurality of time instants, thereby yielding reference-point values and reception-point values, respectively;
quantizing the reference-point values by comparing each of said reference-point values with a first time-invariant threshold and quantizing the reception-point values by comparing each of said reception-point values with a second time-invariant threshold, thereby yielding quantized reference-point values and quantized reception-point values, respectively;
storing the most recent quantized reference-point values and the most recent reception-point values;
assigning a penalty to each of all possible pairs of quantized values, each pair consisting of a quantized reference-point value followed by a quantized reception-point value, said penalty being based on an expected probability of simultaneous occurrence of the values of said pair when the delay is correctly estimated;
for each candidate delay from a set of candidate delays, each expressed as a multiple of the time-distance between consecutive time instants, computing an average penalty by averaging the penalties of a plurality of pairs of stored quantized values, each pair including a stored quantized reference-point value evaluated at a first time instant followed by a stored quantized reception-point value evaluated at a second time instant, wherein the first and the second time instants are time-shifted by the candidate delay; and
electing an estimated delay from the set of candidate delays based on the computed average penalties,
wherein the step of quantizing further comprises comparing values of said at least one quantity with at least one further time-invariant threshold, thereby yielding multi-bit quantized values.

15. The method of claim 14, wherein a first constant penalty is assigned, for a particular quantity, to the simultaneous occurrence of a high quantized reference-point value and a low quantized reception-point value, and a second penalty is assigned to all other occurrences, wherein the first penalty is greater than the second penalty.

16. The method of claim 15, wherein said particular quantity is the signal power in a predetermined frequency band.

17. The method of claim 14, wherein defining the at least one quantity of said signal includes defining at least one of a component in an encoded audio or video format, a power of the signal in a predetermined frequency band, an absolute value of the signal, an amplitude of the signal, an amplitude of the signal envelope, an integral over time of the absolute value of the signal, and an integral over time of the absolute value of the time derivative of the signal.

18. The method of claim 14, wherein the number of further time-invariant thresholds is at most 20.

* * * * *